Figure 1:
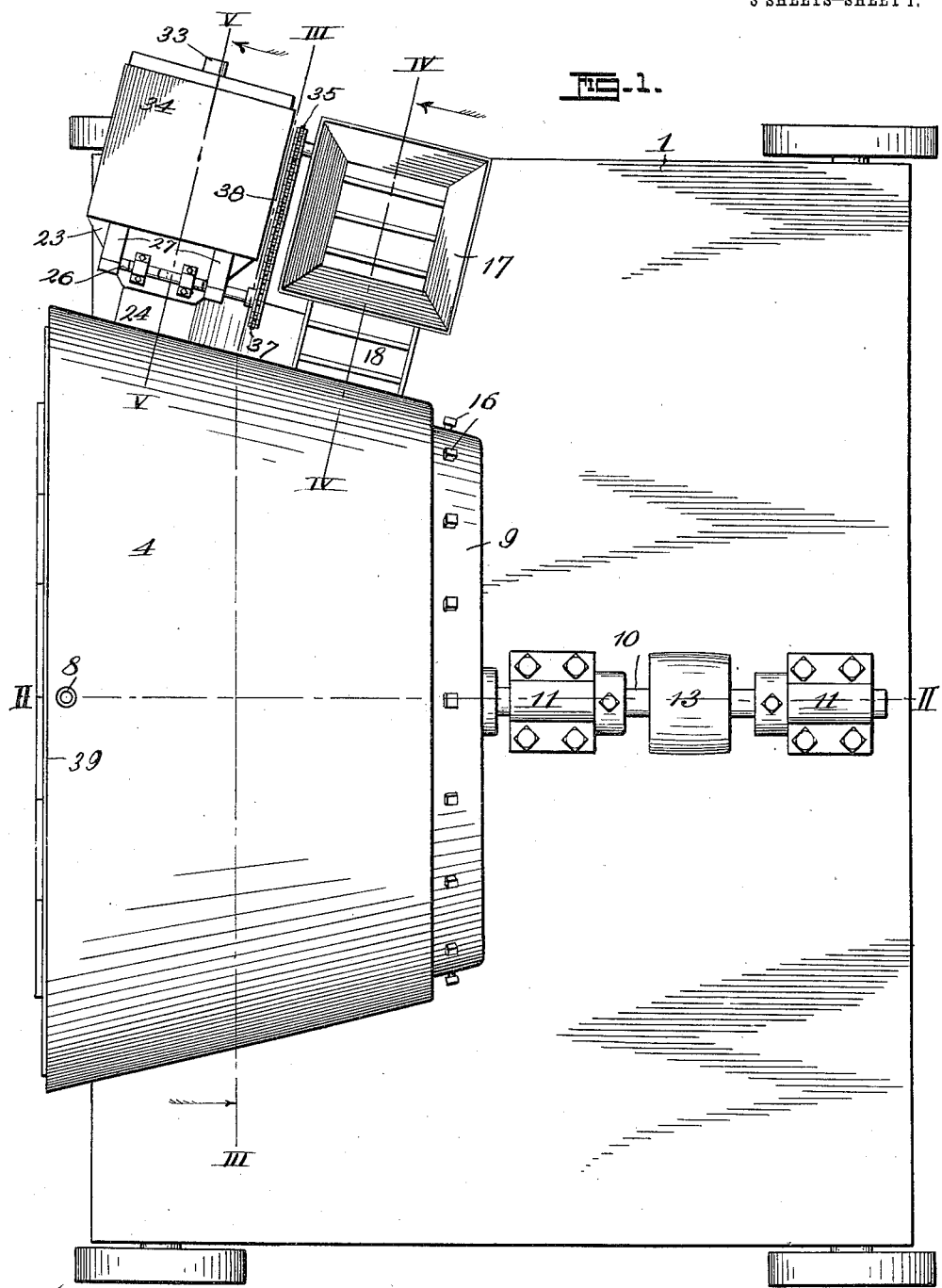

G. F. HUTCHINGS & C. A. WOODY.
MIXING MACHINE.
APPLICATION FILED APR. 1, 1912.

1,092,771.

Patented Apr. 7, 1914.

3 SHEETS—SHEET 1.

Witnesses:
R. Hamilton
E. C. Lillian

Inventors:
George F. Hutchings & Corydon A. Woody,
By F. G. Fischer,
Atty.

G. F. HUTCHINGS & C. A. WOODY.
MIXING MACHINE.
APPLICATION FILED APR. 1, 1912.
1,092,771.
Patented Apr. 7, 1914.
3 SHEETS—SHEET 2.
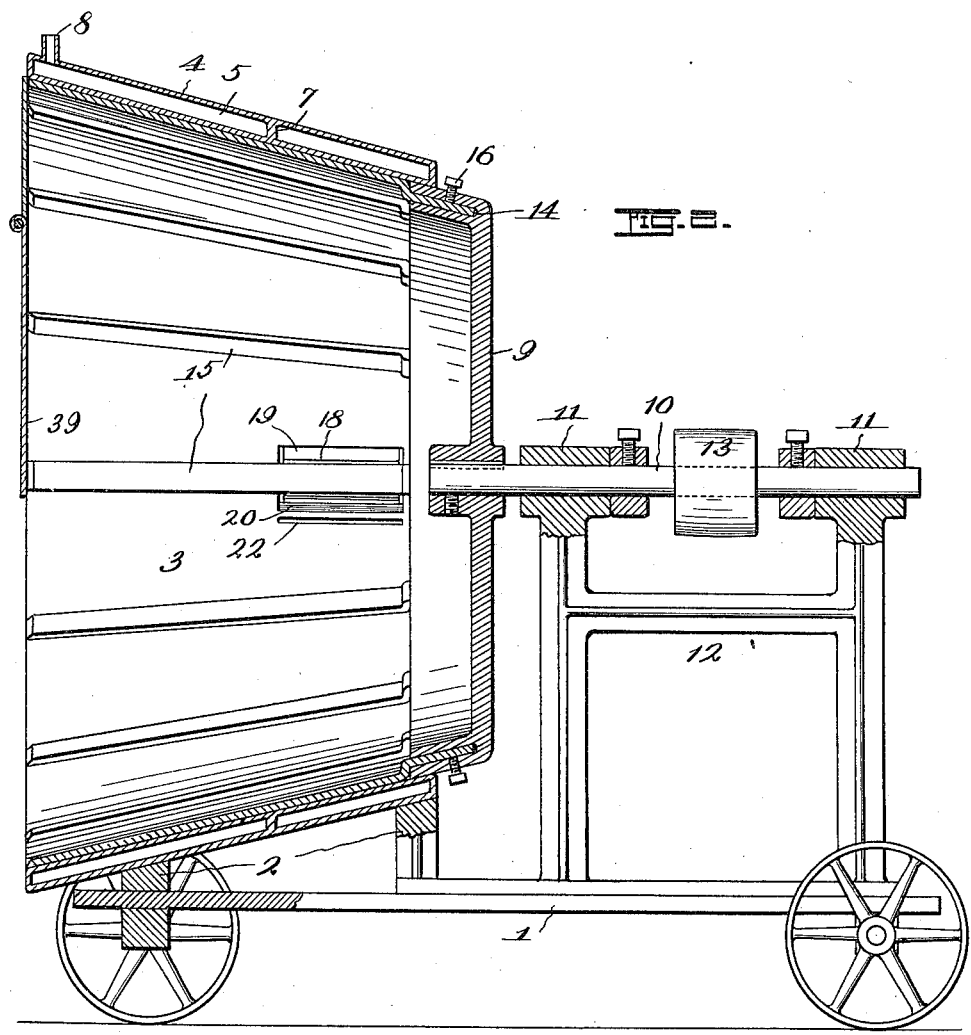
Witnesses:
Inventors:
George F. Hutchings and Corydon A. Woody,
By F. G. Fischer,
Atty.

G. F. HUTCHINGS & C. A. WOODY.
MIXING MACHINE.
APPLICATION FILED APR. 1, 1912.
1,092,771.
Patented Apr. 7, 1914.
3 SHEETS—SHEET 3.
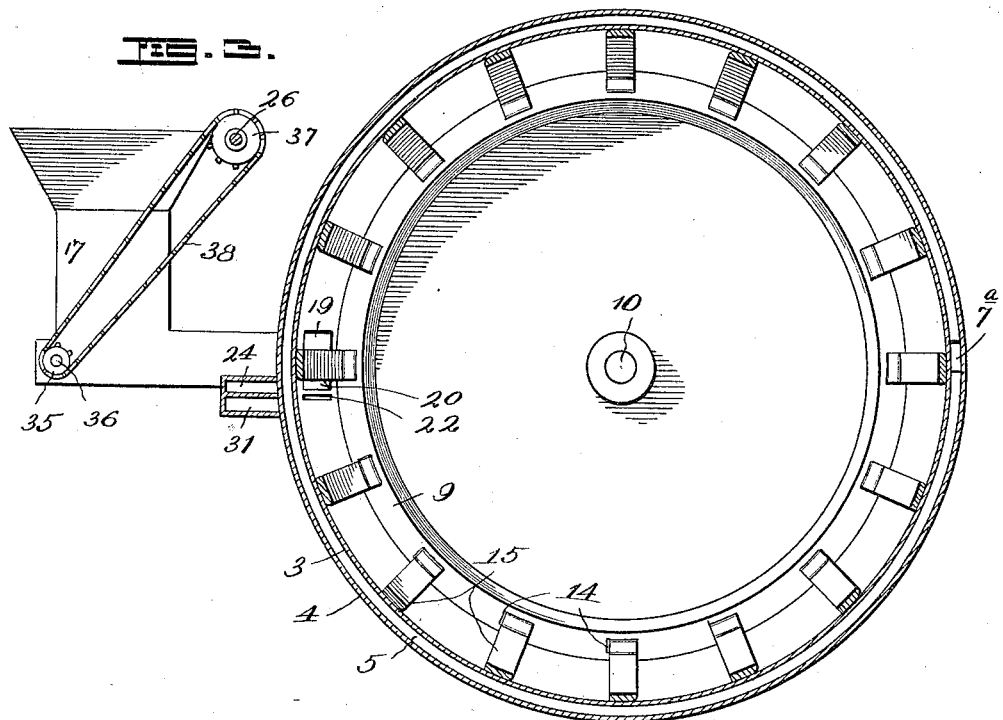
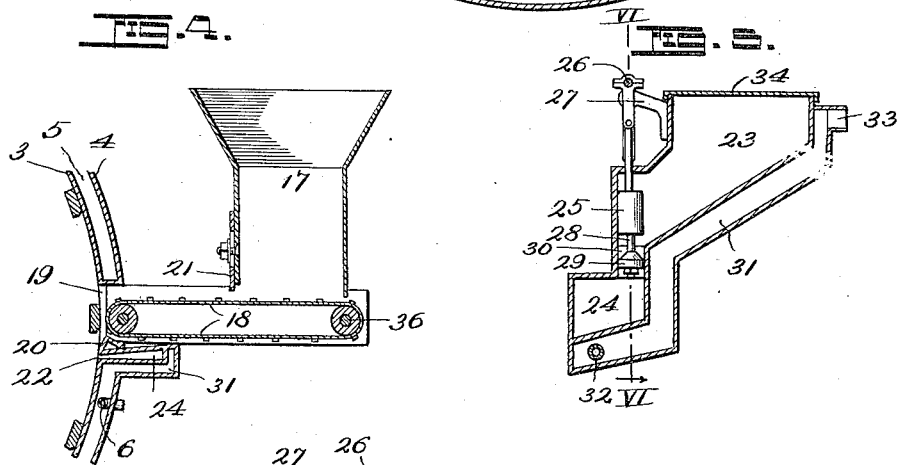
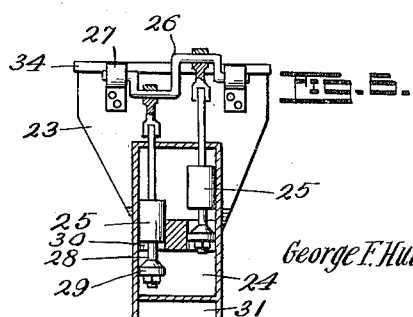
Witnesses:
Inventors:
George F. Hutchings and Corydon A. Woody,
By F. G. Fischer,
Atty.

UNITED STATES PATENT OFFICE.

GEORGE F. HUTCHINGS, OF KANSAS CITY, MISSOURI, AND CORYDON A. WOODY, OF DENVER, COLORADO, ASSIGNORS TO JOSEPH M. JONES, TRUSTEE.

MIXING-MACHINE.

1,092,771.

Specification of Letters Patent.

Patented Apr. 7, 1914.

Application filed April 1, 1912. Serial No. 687,694.

*To all whom it may concern:*

Be it known that we, GEORGE F. HUTCHINGS and CORYDON A. WOODY, citizens of the United States, residing at Kansas City and Denver, in the counties of Jackson and Denver and States of Missouri and Colorado, respectively, have invented certain new and useful Improvements in Mixing-Machines, of which the following is a specification.

Our invention relates to improvements in mixing machines, and our object is to provide a novel machine of this character, especially adapted to mix materials to form a superior wear and water resisting product for highways, railroad beds, reservoirs, or wherever the use of a product of this character is desired.

The product may be cheaply produced from macadam, gravel, earth, or other material, commonly found along highways, reduced to small particles and intermixed with a suitable binder, such for instance as asphalt, tar, oil, etc., until a dense wear-resisting and water-proof mass is obtained.

For the sake of brevity, the term material will hereinafter be employed except in the claims to designate earth, macadam, gravel, or other material commonly found along a highway, and the term binder will be employed to designate asphalt, coal-tar, oil, etc. The binder may normally be in liquid state or reduced to such state by heat at the time of mixing it with the material even though it congeal under normal temperature.

The machine is preferably portable so that it may readily be moved from time to time over a highway, the wearing surface or upper stratum of which is being formed from the product delivered from the machine.

The machine embodies means which receive small but continuous streams of material and binder, which are quickly and intimately intermixed before the binder has time to congeal, and which automatically discharges the product thus produced upon the roadway.

In order that the invention may be fully understood, reference will now be made to the accompanying drawings, in which:

Figure 1 is a plan view of the mixing machine. Fig. 2 is a longitudinal section on line II—II of Fig. 1. Fig. 3 is an irregular cross section on line III—III of Fig. 1. Fig. 4 is a cross section on line IV—IV of Fig. 1. Fig. 5 is a cross section on line V—V of Fig. 1. Fig. 6 is a section on line VI—VI of Fig. 5.

1 designates a wheeled-truck provided at its rear portion with a saddle 2 carrying a stationary shell 3, which may be of truncated conical, or other preferred form. The enlarged rear end of shell 3 overhangs the rear end of the truck 1, so that it will be free to discharge the product in the rear of said truck.

4 designates a jacket surrounding shell 3 from which it is slightly spaced to leave an annular heating-chamber 5 to prevent the binder from congealing before it is thoroughly mixed with the material. Chamber 5 is heated from a burner 6 and is divided by a deflector 7, which throws the heat uniformly around the chamber before escaping through the flue 8 at the upper rear end of the chamber 5, said deflector having an opening 7ª for the passage of heat from burner 6 to flue 8. The forward end of shell 3 is closed by a cup-shaped rotary disk 9, fixedly-mounted upon a shaft 10, journaled in bearings 11 at the upper end of a standard 12, mounted upon the platform of the truck. Shaft 10 is driven by a fixedly-mounted pulley 13, which may be driven by a gas-engine or other suitable motor, not shown, mounted upon truck 1. Disk 9 has a circular row of sockets 14 in which are mounted paddles 15 which lie against the inner surface of shell 3 and extend to the rear end thereof, as shown on Fig. 2, said paddles being removably-secured in the sockets by set-screws 16, so that they can be readily replaced when worn or broken.

17 designates a hopper to receive the material used in producing the product. Said hopper is mounted adjacent shell 3 and communicates at its lower end with an endless conveyer 18, which conducts the material to a small elongated feed opening 19, through which the material is introduced into shell 3. Feed-opening 19 extends inward from jacket 4 to shell 3 and is preferably on a level with the horizontal axis of said shell, and the bottom of said opening inclines downward at its forward portion 20, so that material will be discharged into the interior of shell 3 in substantially the same direction traveled by the paddles 15.

The quantity of material fed from hopper 17 to opening 19 is regulated by a vertically-adjustable gate 21, mounted upon one side of the hopper.

Arranged immediately beneath feed-opening 19 is a feed-opening 22, for the delivery of the binder. Feed-opening 22 is in the form of an elongated slot, preferably, of the same length as the feed-opening 19, see Fig. 2, so that the sheet of liquid binder delivered by said feed-opening 22 will come into contact with substantially every particle of material carried past said feed-opening by the paddles 15. Feed-opening 22 receives its supply of binder from a hopper 23, through a duct 24, through which the binder is forced by a pair of reciprocatory plungers 25 actuated by a crank-shaft 26, journaled in bearings 27 secured to one side of hopper 23. Plungers 25 have depending stems 28 provided at their lower ends with disks 29, to regulate the passage of the binder through the ports 30, which establish communication between the lower end of hopper 23 and the top of duct 24.

If the binder be introduced into the hopper 23 in solid state, it is reduced to a liquid before leaving said hopper by heat from a hot-air chamber 31, which extends beneath said hopper 23 and the duct 24 to retain the binder in liquid state, so that it may become intimately mixed with the material. Hot-air chamber 31 receives its heat from a burner 32, and said chamber has a flue 33 at its upper end for the escape of the products of combustion. After the hopper 23 has been filled with binder, said hopper is closed by a lid 34 to retain the heat therein.

As the best results are obtained by mixing the material and binder in certain proportions, I gear the conveyer 18 and the plungers 25 together through the intermediacy of a sprocket-wheel 35 fixed to one end of shaft 36 of conveyer 18, a sprocket-wheel 37 fixed to one end of the crank-shaft 26 and an endless sprocket-chain 38 running around said sprocket-wheels. Either of the shafts 26 or 36 may be driven by the motor on the truck 1. The material is prevented from being too widely scattered when delivered from shell 3, by an adjustable shield 39, partly closing the rear end of said shell.

The operation briefly stated is as follows: Burners 6 and 32 are lighted to heat the chambers 5 and 31, respectively, and hoppers 17 and 23 are supplied with material and binder. The motor is then started to drive paddles 15, conveyer 18, and the plungers 25. As the material and the binder are delivered through their respective feed-openings 19 and 22 into shell 3, the material is broken up into small particles and intimately intermixed with the binder by the swiftly rotating paddles 15, which carry it around within shell 3 until the mixing process is completed when the product is finally discharged from said shell. Should it be found that too much or too little material is being carried to shell 3, the proper proportion is obtained by adjusting gate 21 up or down. The hoppers are replenished from time to time in order that the apparatus may be kept in continuous operation. It is important to keep the material and the binder separate until they enter the shell, as otherwise the binder would congeal and result in becoming mixed with the material in improper proportions. The binder would also gum up the conveyer 18 and interfere with its proper operation.

While we have shown and described the preferred form of our mixing machine, we do not limit ourselves to the exact arrangement and construction of parts disclosed by the drawings, but reserve the right to make such changes as properly fall within the spirit and scope of the appended claims.

Having thus described our invention what we claim and desire to secure by Letters Patent, is:

1. A machine of the character described, consisting of a support, a stationary shell mounted upon said support, said shell being open at both ends and having two feed openings, each for a different material, a rotary disk closing one end of said shell, and a plurality of paddles carried by said disk and coacting with the shell to mix the material and discharge the resultant product from the shell.

2. A machine of the character described, consisting of a support, a truncated conical shell mounted on said support and having its enlarged open end overhanging the rear end of said support, said shell having two feed openings, each for a different material, a cup-shaped disk closing one end of said shell, paddles secured to said disk and projecting into said shell and extending lengthwise thereof, a driven shaft upon which the cup-shaped disk is mounted, a conveyer to conduct material to one of said feed-openings, and means to conduct material to the other feed-opening.

In testimony whereof we affix our signatures, in the presence of two witnesses.

GEORGE F. HUTCHINGS.
CORYDON A. WOODY.

Witnesses:
F. G. FISCHER,
E. C. LILLIAN.

---

Copies of this patent may be obtained for five cents each, by addressing the "Commissioner of Patents, Washington, D. C."